United States Patent [19]

Virkar et al.

[11]  4,407,912
[45]  Oct. 4, 1983

[54] ELECTROCHEMICAL CELL UTILIZING MOLTEN ALKALI METAL ELECTRODE-REACTANT

[75] Inventors: Anil V. Virkar, Sandy; Gerald R. Miller, Salt Lake City, both of Utah

[73] Assignees: Ceramatec, Inc.; University of Utah, both of Salt Lake City, Utah

[21] Appl. No.: 310,859

[22] Filed: Oct. 13, 1981

[51] Int. Cl.³ ............................................. H01M 4/36
[52] U.S. Cl. ..................................... 429/104; 429/50; 429/193
[58] Field of Search ................. 429/104, 50, 102, 193

[56] References Cited

U.S. PATENT DOCUMENTS

3,404,035  10/1968  Kremmer et al. .............. 429/104 X
3,404,036  10/1968  Kremmer et al. .............. 429/104 X
3,458,356  7/1969   Kremmer et al. .............. 429/104 X Primary Examiner—Charles F. LeFevour
Attorney, Agent, or Firm—Trask & Britt

[57] ABSTRACT

An improved electrochemical cell comprising an additive-modified molten alkali metal electrode-reactant and/or electrolyte is disclosed. Various electrochemical cells employing a molten alkali metal, e.g., sodium, electrode in contact with a cationically conductive ceramic membrane experience a lower resistance and a lower temperature coefficient of resistance whenever small amounts of selenium are present at the interface of the electrolyte and the molten alkali metal. Further, cells having small amounts of selenium present at the electrolyte-molten metal interface exhibit less degradation of the electrolyte under long term cycling conditions.

14 Claims, 7 Drawing Figures

Resistivity vs. time for a cell containing 1% Se.

Fig. 4

Resistivity vs. time plot for a cell containing 1/4% Se.

ELECTROCHEMICAL CELL UTILIZING MOLTEN ALKALI METAL ELECTRODE-REACTANT

This invention was made under a Department of Energy grant.

BACKGROUND OF THE INVENTION

1. Field

This invention relates to high temperature electrochemical cells employing molten alkali metal as an electrode-reactant.

2. Prior Art

Various types of electrochemical cells employing molten alkali metal electrode-reactants are known. These cells generally employ an ionically conductive ceramic, e.g., beta''-alumina, or glass membrane through which alkali metal ions pass.

Secondary batteries employing a molten sodium electrode and a molten sulfur electrode are described in U.S. Pat. Nos. 3,404,035 and 3,404,036 to Kummer et al. A primary battery having a molten sodium reactant in contact with a sodium ion conductive ceramic membrane is described in U.S. Pat. No. 3,458,356 to Kummer et al.

These cells experience a higher internal resistance than is generally desired. For example, a secondary battery of the type described in U.S. Pat. Nos. 3,404,035 and 3,404,036, has an electrical resistance across the ceramic membrane corresponding to a specific resistivity of the electrolyte membrane which is generally at least 4 to 5 ohm-cm when the cell is operated at about 300° C. This internal resistance of the membrane diminishes the overall effectiveness and efficiency of the cell.

OBJECTS OF THE INVENTION

It is an object of the instant invention to lower the internal resistance of an electrochemical cell employing a molten alkali metal electrode-reactant contacting a cationically conductive, inert, solid membrane.

Another object of the instant invention is to provide a simple, compatible additive for intermixing with the alkali metal electrode-reactant or electrolyte.

A third object of the instant invention is to decrease the temperature dependence of the resistance of an electrochemical cell employing a molten alkali metal electrode-reactant containing a cationically conductive solid membrane.

DESCRIPTION OF THE INVENTION

An improved electrochemical cell employing a molten electrode-reactant has been invented. The improved cell comprises a molten alkali metal, e.g., sodium, as an electrode-reactant in contact with a cation-conducting membrane, such as certain cation-conducting ceramics, e.g., sodium aluminates such as beta and beta''-alumina, and glasses, wherein a minor quantity of selenium is present at or adjacent to the interface between the cation-conducting membrane and the molten alkali metal. On the opposite side of the cation conducting membrane or electrolyte may be a reactant such as sulfur or the same molten alkali metal.

The presence of minor quantities of selenium at or near the interface between the cation-conducting membrane and the alkali metal electrode-reactant of such electrochemical cells has resulted in a significant reduction in the internal resistance of the cell. The presence of selenium at or near such interface brings about lower cell resistance without causing any apparent deleterious effect. Selenium containing cells further demonstrate conductivity which is less temperature dependent than cells without selenium. Also, in most instances there was less electro-mechanical degradation of the membrane after extended operation of selenium containing cells, thus increasing the effective operating life of a cell.

The exact mechanism by which selenium improves conductivity is not fully understood. The presence of selenium may improve the wetting of the ceramic or glass membranes by the molten alkali metal, although improved wetting alone would not appear to provide the degree of improvement in conductivity nor its diminished temperature dependence. The selenium may be affecting the cation conducting membrane in some fundamental way, such as through absorption or diffusion into the membrane.

The molten alkali metals useful in this invention include potassium, sodium and lithium. Sodium is generally preferred inasmuch as the use of sodium in contact with a sodium-containing membrane has appeared very promising in electrochemical cells. For example, much effort has been expended to perfect a sodium-sulfur battery utilizing a ceramic or glass electrolyte containing mobile sodium ions.

The solid, ceramic electrolyte preferably used in this invention is a sodium aluminate identified as beta''-alumina which contains very mobile sodium ions. The material contains about 5 moles alumina to one mole of soda. Minor quantities of lithia ($Li_2O$), magnesia (MgO), yittria ($Y_2O_3$) or zinc oxide (ZnO) may be present as stabilizing agents. The preparation of suitable beta''-alumina electrolytes is set forth in U.S. Pat. Nos. 4,020,134; 3,811,943; 3,719,531; 3,535,163 and 3,465,225, the disclosures thereof being incorporated herein by reference.

Another useful electrolyte includes beta-alumina, a sintered ceramic having an alumina to soda molar ratio of about 9 to 11:1. Generally, a higher resistance across the electrolyte is experienced with beta-alumina than with beta''-alumina.

Other useful electrolytes include certain glasses, such as those described in Kummer, U.S. Pat. No. 3,404,035, and certain ceramic materials identified as NASICON, which is a sintered body of soda, silica, zirconia (or yittria) and/or phosphate, generally described in U.S. Pat. Nos. 4,049,891 and 4,117,103 to Hong.

In the operation of cells containing a molten sodium electrode-reactant, a typical resistivity exhibited by a beta"-alumina electrolyte has been observed to be optimized at about four to five ohm-cm. A typical resistance of a beta-alumina electrolyte in a similar cell is generally about two times higher than for cells with a beta"-alumina electrolyte membrane.

The presence of very minor quantities of selenium at or near the interface between the electrolyte and the molten alkali metal, e.g., sodium, in such cells provides a significant decrease in the resistivity across the cationically conductive ceramic electrolyte. The presence of selenium, in small quantities, e.g., less than one-half percent by weight of the sodium present, reduces the resistance across the electrolyte by about 50% within a very short time after the addition is made.

The presence of very minor quantities of selenium at the interface of the electrolyte and alkali metal (e.g., sodium) in such cells also provides a significant decrease in the temperature coefficient of resistance across the cationically conducting ceramic electrolyte. The effective decrease of the temperature coefficient is dramatic in that the activation energy between 200° C. and 400° C. for sodium ion conduction in cells with liquid sodium electrodes containing selenium is less than one-half the value found in cells containing no selenium in its liquid sodium electrodes.

The quantity of selenium present in the molten alkali metal electrode-reactant of an electrochemical cell may vary over a wide range. The presence of extremely small amounts, e.g., as low as 0.01% by weight of selenium based upon the quantity of alkali metal, produces excellent results, but only after an extended period of time. At quantities less than about 0.01% by weight the effect of selenium on resistivity will tend to diminish in proportion to the quantity of selenium present. Since the effect is very pronounced and relatively immediate at levels of about one-half to about one percent, higher levels are usually not necessary.

As indicated hereinabove, selenium may be added to a molten sodium electrode-reactant in a sodium-sodium cell or in a sodium-sulfur cell with very beneficial results. Also, the impervious, solid ceramic or glass electrolyte may contain selenium at or near its surface, e.g., as a coating by vapor disposition or other means, or by absorption of selenium upon or within the surface. Further, the selenium may be chemically incorporated in the electrolyte as part of its basic composition, although selenium is very volatile at the sintering temperatures. The beneficial lowering of resistivity is achieved by constructing a cell so that the selenium coated side of the electrolyte is in contact with the molten alkali metal, e.g., sodium.

EXAMPLE I

Figure 2:
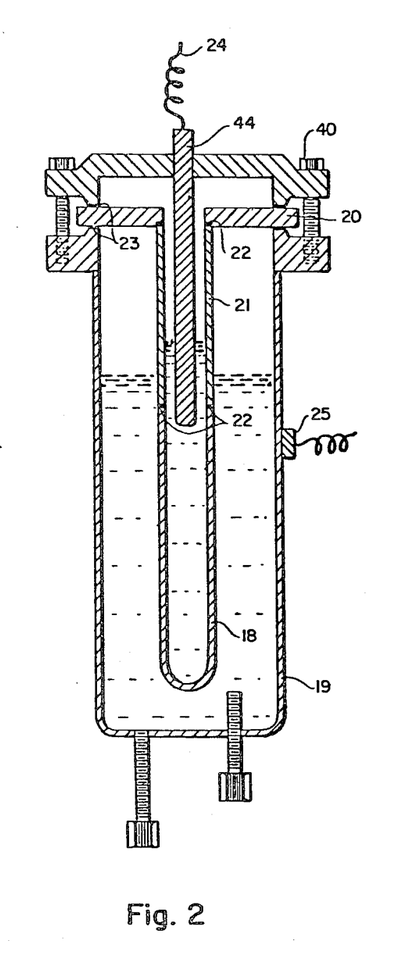
FIG. 2 is a sectional elevational view of a sodium-sodium cell as would be used in the electrorefining of sodium.

A cell constructed in accordance with FIG. 2 was filled with sodium in both chambers, i.e., within the closed end beta"-alumina tube and in the chamber surrounding said tube. A total of about 76 grams of sodium was placed in the cell. The sodium contained approximately one percent by weight of selenium. The tube had a wetted area (inside surface) of about 18.9 cm². The cell was gradually heated to a temperature of 400° C. at which time about 19 amperes were applied to external circuit to provide a current density of about 1 amp/cm².

The direction of the current was reversed periodically to drive sodium in one direction, then to drive it in the other direction to maintain the sodium volume within the volumetric limits of both the internal and external cavities.

At the outset, resistivities in the range of about 1.2 ohm-cm were achieved. Resistivities less than about 2.0 ohm-cm were realized for the entire duration of the experiment at temperatures of about 400° C. At times during the 365 hour duration of the experiment, the cell temperature dropped below 300° C. At such temperatures the cell resistivity was slightly above 2.0 ohm-cm. At temperatures between 300° C. and 400° C. the measured resistivity was below 2.0 ohm-cm.

Figure 3:
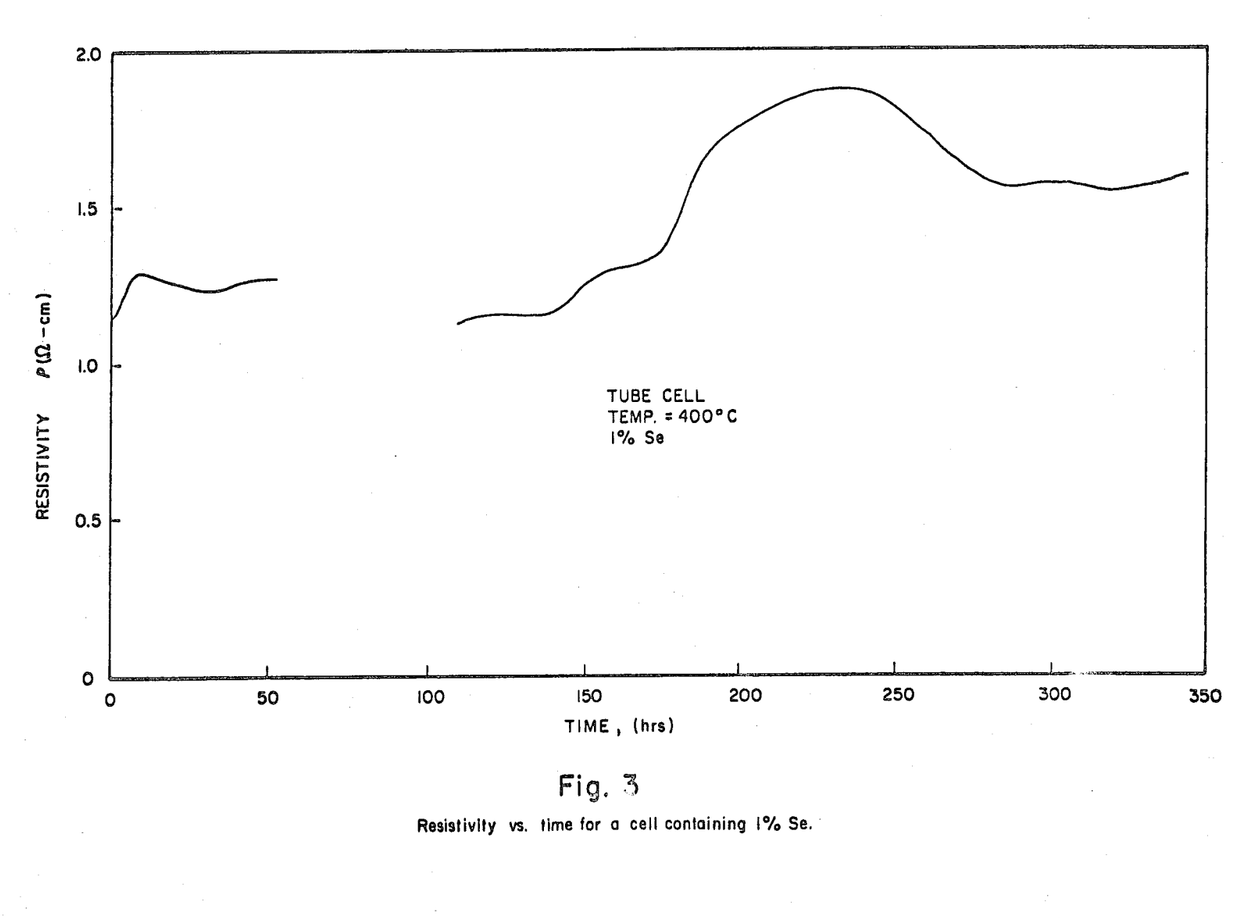
FIG. 3 is a graph illustrating the resistivity of a sodium-sodium cell containing about 1% by weight selenium in the material.

A plot of resistivities determined during the experiment is presented in FIG. 3. During the period between the 50th and 100th hours, difficulty was experienced maintaining the cell temperature near 400° C. The resistivities during this period are not illustrated inasmuch as resistivity increases with decreasing cell temperature. Variations in cell performance can be determined only by operating at a substantially constant cell temperature.

A substantially similar cell containing only sodium operated under substantially similar conditions typically exhibit resistivities from about 4 and 5 ohm-cm.

EXAMPLE II

A second experiment was conducted using selenium additions to sodium in a sodium/sodium cell substantially identical to Example I.

About 30 grams of sodium were placed in each cavity (external and internal of the beta"-alumina tube) of the cell. The cell was operated at a current density of about 0.5 amp/cm² at a temperature of about 200° C.

In contrast to the cell of Example I, this cell had about one-fourth percent of selenium in the sodium in each cavity.

Figure 4:
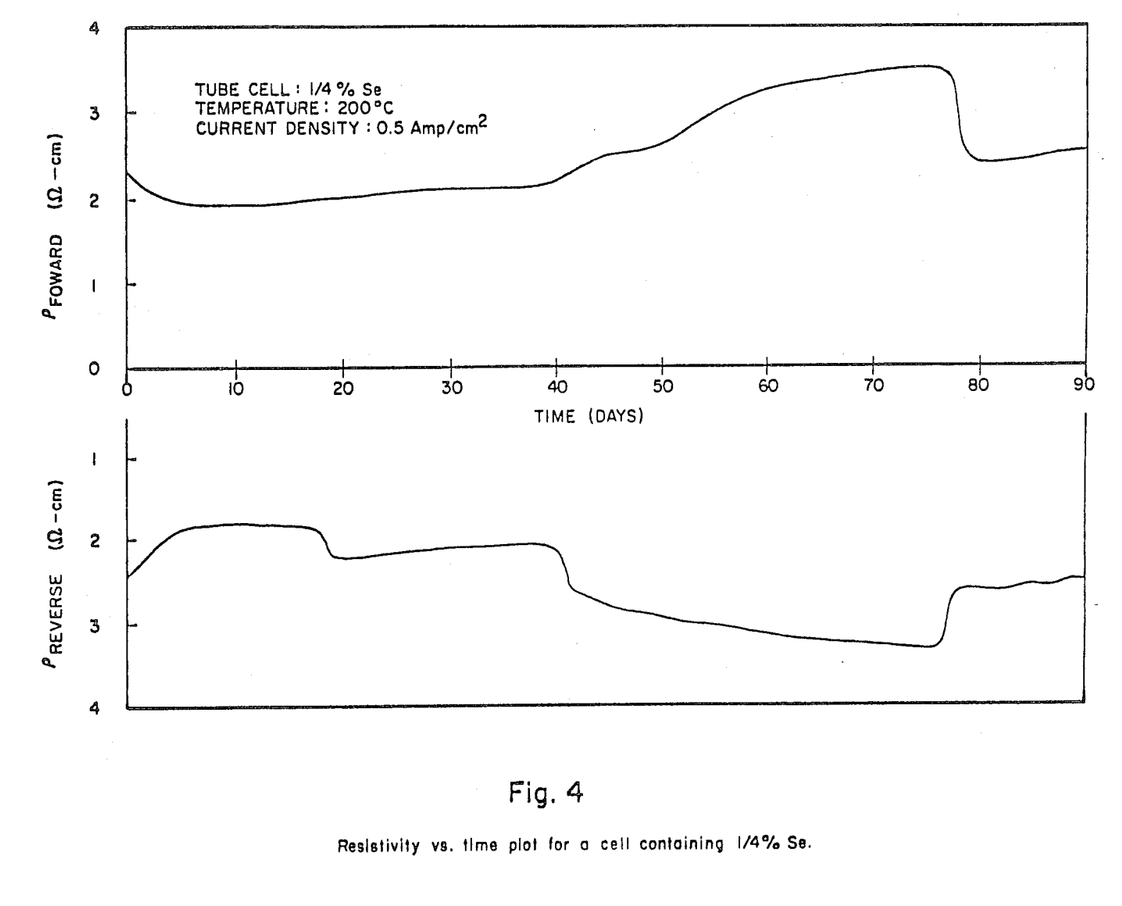
FIG. 4 is a graph illustrating the symmetrical behavior of a cell containing about ¼% selenium in each cell compartment.

The cell was operated for about three months. The resistivities measured during the experiment are plotted in FIG. 4. The cell resistivity was substantially symmetrical, i.e., the resistivity was comparable regardless of the direction of the current. (In Example I, the resistivity was slightly greater when ions were being driven from the sodium containing cavity to the sodium selenium containing cavity.)

Initial cell resistivities of about 2.5 ohm-cm were measured. The cell resistance then dropped to about 2.0 ohm-cm where it remained during about the next forty days. No apparent explanation was determined for the slight rise in resistance during the next forty days.

The experiment was arbitrarily concluded on the 90th day so that the cell could be dismantled and examined. The cell was operating in about the same manner after ninety days as it had early in the experiment.

Upon disassembly, no deterioration or cracks were found in the tube. The tube exhibited a light gray color in contrast to its white color prior to assembly of the cell. Selenium metal is gray in color, indicating the possibility of absorption or interaction of the selenium with the tube surface.

EXAMPLE III

Another experiment was conducted in a sodium/sodium cell in which about 100 parts per million selenium were added to each cavity of the cell. A total of about 13 and 287 grams of sodium were than added on the inside and the outside of the electrolyte.

The cell was operated at a temperature of about 320° C. and at a current density of about 0.625 amps-cm. Initial resistivities in the range of about 4.5 to about 5.8 ohm-cm were observed. After the cell had been operated for about 153 days, the resistivity leveled off at about 2.9 ohm-cm and exhibited an activation energy for sodium ion conduction of about 2.1 kilocal/mole.

This cell operated in a symmetric manner, exhibiting about the same resistance regardless of current direction. The cell was terminated after passing a total charge of about 29 ohm-cm. No evidence of degradation was found.

Figure 5:
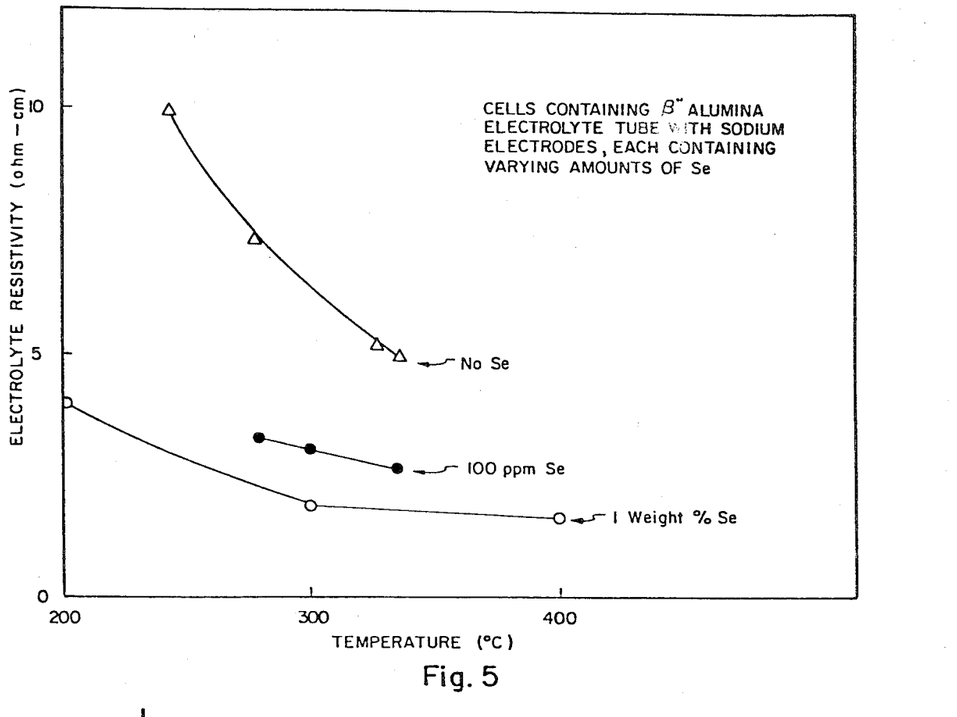
FIG. 5 is a graph illustrating the decreased dependence of resistivity upon temperature of cells containing selenium.

Two substantially similar cells were operated in the same manner as control cells. The control cells contained no selenium. These cells exhibited resistivities about twice as high as the selenium containing cell and also showed asymmetry, i.e., the resistance was approximately 30% greater when current was passed in one direction than when it was passed in the other direction. The B"-alumina electrolytes failed after passing 330 and 15.40 Ah/cm$^2$, respectively, degrading by means of localized cracks. FIG. 5 depicts the drastic effect of lowering the electrolyte resistivity and temperature dependence of the resistivity.

EXAMPLE IV

Figure 6:
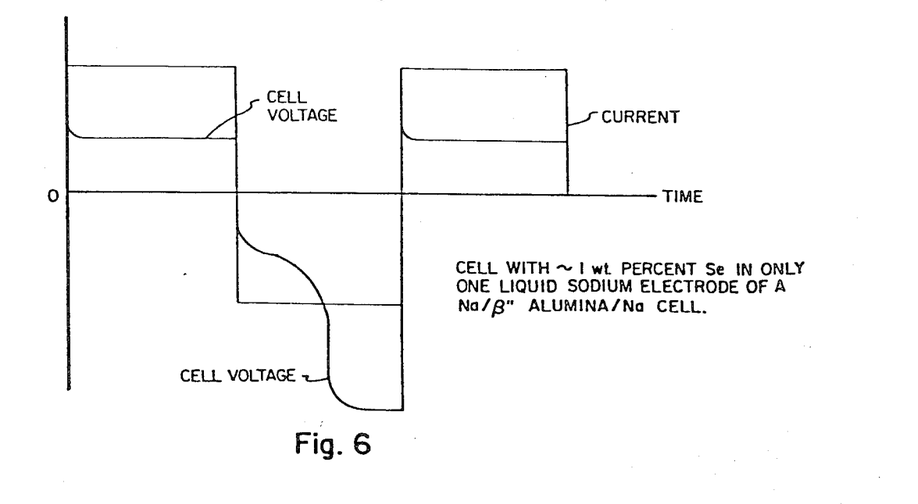
FIG. 6 is a graph illustrating the asymmetrical behavior of a sodium-sodium cell containing selenium in only one cavity.

A cell similar in construction to that shown in FIG. 2 was constructed except that approximately one-fourth ($\frac{1}{4}$) weight percent selenium was added to the sodium contained outside the B"-alumina conducting membrane but no selenium was added to the sodium in the annulus between the B"-alumina membrane and the outer stainless steel container. Upon passing direct current of current densities up to about 0.3 amperes per cm$^2$ of outer electrolyte membrane surface area, the electrolyte resistivity was found to be about 1.4 to 1.8 ohm-cm at about 320° C. whether the sodium ion current flow was into or out of the control chamber. Similar cells containing no selenium whatever typically exhibit resistivities of 4–5 ohm-cm at this temperature. Upon raising the current density to approximately one (1) ampere per cm$^2$ of outer electrolyte membrane surface area, the resistivity of the electrolyte was found to be 2.2 to 2.3 ohm-cm at about 280° C. when the sodium ion current flow direction was from the sodium containing selenium outer electrode to the pure sodium inner electrode. At this same current density and temperature the electrolyte resistivity was found to be 4.8 to 5.2 ohm-cm when the sodium ion current flow direction was from the inner sodium electrode to the outer sodium electrode which contained the selenium. This latter value is similar to the values measured on cells containing no selenium in either electrode. FIG. 6 depicts the current and voltage characteristics of this cell when operated at such high current densities.

In each of the above-described experiments, the selenium was added to the electrode chamber prior to the addition of the alkali metal. The procedure involved placing a predetermined quantity of selenium granules or pellets in the electrode chamber (generally this was the anode chamber). The cell was then heated at about 300° C. to 400° C. to dry the cell inasmuch as alkali metals, particularly sodium, react vigorously with water. The heating temperature was maintained well below the boiling point of selenium, which is about 700° C. Some small amount of selenium may have vented along with any moisture present. However, the amount lost is considered nominal. The heating was generally conducted for less than about three days.

Alkali metal, e.g., sodium, was added to the cells at a cell temperature of 120° C. The cell was then sealed and operated as indicated in the above experiments.

Similar results was achieved in cells in which the selenium is added after the alkali metal is introduced. Care must be taken in so adding the selenium inasmuch as some reaction may occur between moisture adsorbed by the selenium and the sodium.

EXAMPLE V

In this experiment, approximately 0.25% of selenium (based upon weight of sodium present) was placed in the outer chamber of a cell. The cell was heated to about 300° C. for a short duration to dry the cell. The heating period was shorter than in prior experiments and at a lower temperature. Less vaporization of selenium would be expected.

The cell was filled (both chambers) with liquid sodium and cycled electrically, i.e., the current direction was regularly reversed.

The cell was cycled from 475° K. to 700° K. (about 200° C. to about 400° C.) while the current was periodically cycled (about five minute intervals in each direction).

The activation energies determined during various cycles are set forth in the following table:

TABLE 1

| | ACTIVATION ENERGIES (KCal/Mole) | | | |
|---|---|---|---|---|
| | Cooling | | Heating | |
| Cycle | Forward | Reverse | Forward | Reverse |
| 1 | 2.1911 | 2.7400 | 2.7894 | 2.4110 |
| 2 | 3.3475 | 3.5422 | 2.6224 | 2.7196 |
| 3 | 3.1126 | 2.9980 | 2.8187 | 2.9290 |
| 4 | 3.2625 | 2.9775 | 3.2152 | 3.0700 |
| 5 | 3.4745 | 2.7558 | 1.9665 | 1.8100 |
| 6 | 2.5982 | 1.8590 | 2.2787 | 1.8865 |

*Forward direction denominates the passage of current in a manner such that sodium ions are driven from the outer chamber through the electrolytes to the inner chamber.

Figure 7:
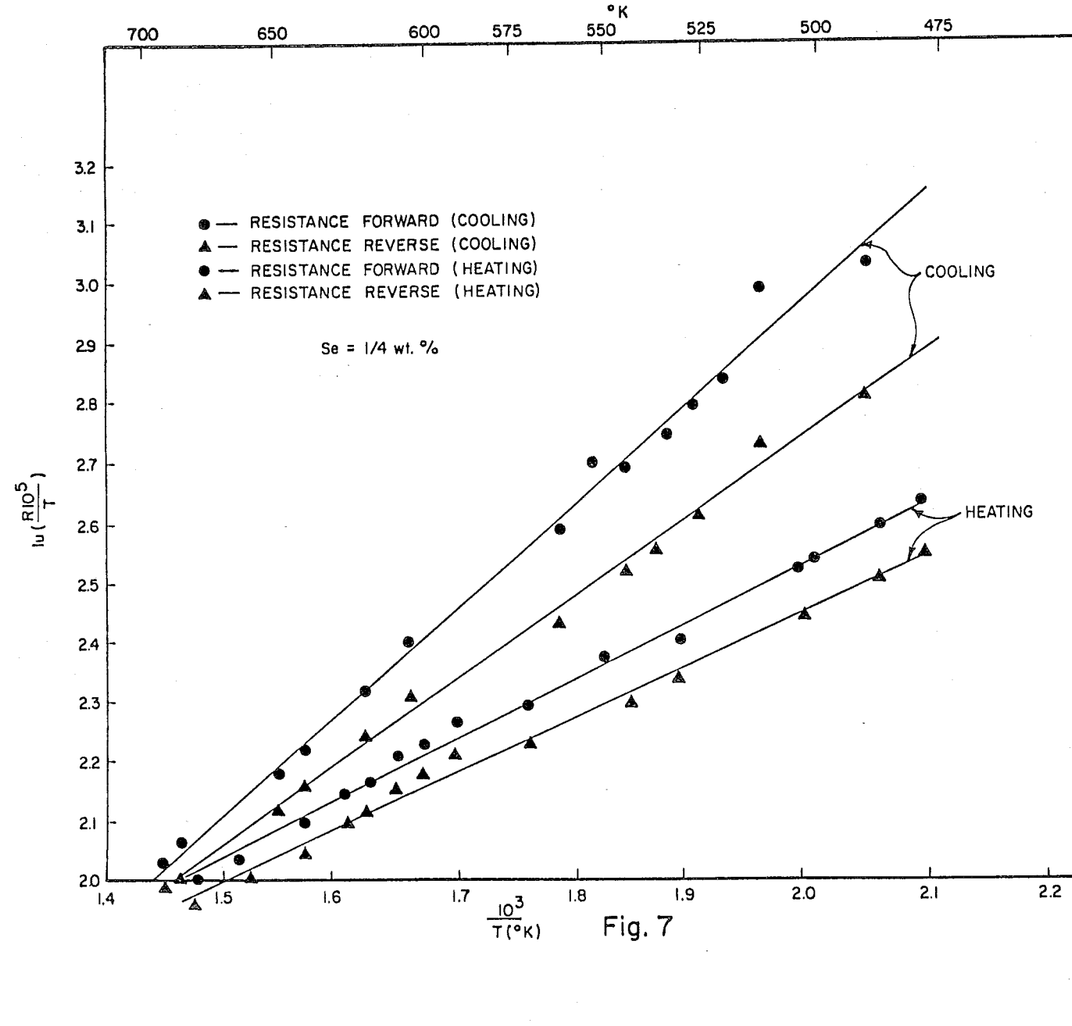
FIG. 7 is a graph illustrating the effect upon cell resistance of temperature cycling.

The data obtained is further illustrated in FIG. 7. This graph depicts the variance of cell resistance with temperature. The log of the resistance $\times 10^5$ divided by the temperature is plotted against the reciprocal of the temperature $\times 10^3$.

EXAMPLE VI

The effect of selenium vapors on beta"-alumina ceramics was investigated by heating selenium at about 550° C. in an enclosed container so that only selenium vapors contacted a sintered and annealed sample of beta"-alumina which had been powdered.

Upon later examination in the atmosphere, the powder had a reddish brown cast. Sodium selenide is known to turn red in the presence of moisture. The color disappeared upon heating of the sample to 350° C., which may indicate that the moisture was driven out.

A coarse-grained beta"-alumina brick was heated to 300° C. with powdered selenium thereon. The selenium melted. Later examination determined a reddish hue to exist where the selenium had laid. The grain boundaries were of a darker reddish color.

The selenium may be concentrating in the grain boundaries of the beta"-alumina, which could be enhancing the conductivity of such material when it is used as an electrolyte.

In addition to the above-described work, the activation energy for the diffusion of sodium ions as measured from ionic conductivity measurements from 200° C. to 300° C. on a beta"-alumina tube which had passed in excess of 1,000 Ah/cm$^2$ in a cell containing one-half percent by weight of selenium in a period of three months without degradation was found to be 2.56 kilocal/mole. This measurement was done in the axial direction using sodium nitrate and sodium nitrite as the electrodes. Similar measurements on pristine beta"-alumina tubes gave activation energies of 3.9 kilocal/mole.

Since activation energy is a measure of the amount of energy to move the sodium ion within the electrolyte, the above data supports a theory that the selenium is having a beneficial effect upon the electrolyte and that advantageous cell operation would result from selenium treated electrolytes apart from the inclusion of selenium in one or both electrodes.

The cells utilized in the experiments set forth herein were constructed similar to the cell illustrated in FIG. 2. These cells provide an inner tubular cavity and an outer annular cavity, each of which may be filled with a liquid alkali metal.

The electrolyte tube 18 may be constructed of beta"-alumina or other suitable alkali metal ion conductive material. The outer canister 19 is constructed of stainless steel. An insulating disk 20, e.g., of alpha-alumina, electrically isolates the electrolyte and canister. In the instant structure, an alpha-alumina tube 21 connects the disk and the electrolyte tube. Glass seals 22 join the tubes together as well as join the alpha-alumina tube to the disk 20. Aluminum washers 23 act as compression seals between the canister 19 and the header 24 and the disk 20. Electrical contacts to each chamber are provided by connectors 24 and 25.

Figure 1:
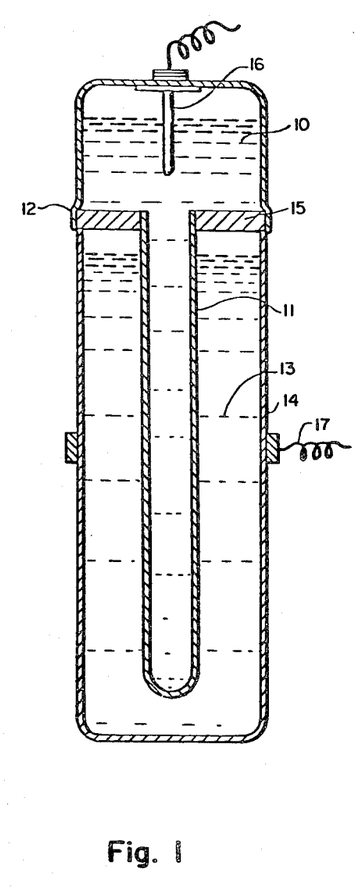
FIG. 1 is a schematic view of a sodium-sulfur secondary battery cell.

A typical sodium-sulfur secondary battery cell is illustrated in FIG. 1. The liquid sodium anodic material 10 is contained within a solid tubular electrolyte 11, e.g., a beta"-alumina tube, and a metal housing 12 to provide an expansion cavity for the liquid sodium. In the practice of the instant invention, selenium would be present as an additive to the liquid sodium. It could also be present adjacent the anodic interface of the electrolyte as a coating upon the electrolyte or absorbed into the surface of the electrolyte. Liquid sulfur 13 forms the cathodic reactant of the cell. The canister or container 14 enclosing the sulfur must be corrosion resistant as well as electronically conductive. One suitable material is doped rutile, the system being described in U.S. Pat. No. 4,160,069 to Johnson et al, the disclosure thereof incorporated herein by reference. An electrically insulating seal 15 physically separates the anode and cathode materials. The seal, preferably of alpha alumina must be corrosion resistant as well as being ionically and electronically nonconductive. The electrical leads to a load are provided by electrically conductive members 26 and 30, which interact with the anode and cathode, respectively.

A particular advantage of the instant invention resides in the lowering of resistivity of a cell regardless of its use as a battery or as a refining or electrowinning cell. In an electrowinning cell, in which an alkali metal is recovered by an alkali metal salt, the structure would be similar to that shown in FIG. 2.

Further advantages of the instant invention are realized in the reduced temperature dependence and the reduced asymmetry of cells containing selenium in at least one chamber.

Typical sodium-sodium or sodium-sulfur cells utilizing a beta"-alumina electrolyte demonstrated considerable variance of resistivity dependent upon cell operation. Low resistivities could be obtained, e.g., at temperatures above 400° C., however, cell pressurization (particularly from vapor pressure of sulfur) and corrosion increasingly became problems at higher temperatures. Thus, the attainment of low resistivities at lower temperatures, i.e., a flatter resistivity versus temperature curve, should enhance operating life as well as minimize the importance of temperature control.

Although the effect of selenium appears to be most pronounced when the current is passed in a direction to drive the sodium containing selenium towards the electrolyte, a lower than usual resistivity has been observed when the sodium ions were being driven through the electrolyte towards the selenium modified sodium electrode.

If the advantages realized by the instant invention are occurring through concentration of the selenium in the grain boundaries of the electrolyte, e.g., a ceramic sodium aluminate such as beta"-alumina, then an extremely small amount of selenium would be effective. Thus, the concentration of selenium measured by either the weight of one or both electrodes or the weight of the electrolyte may be very small.

In either the electrodes or electrolyte, the selenium may be present in ionic form. In the description contained herein, the use of the term selenium is intended to include both the ionic and metallic form of the element.

We claim:

1. An improved electrochemical cell comprising;
a first electrode of a molten alkali metal;
a solid, impervious electrolyte containing a mobile alkali metal ion of the same alkali metal as is present in said first electrode, said electrolyte separating said first electrode from a second electrode;
a second electrode of a molten material receptive to the mobile alkali metal ion in said electrolyte; and
at least sufficient selenium present at the interface between said molten alkali metal of said first electrode and said electrolyte to effect a lowering of the internal cell resistance.

2. The electrochemical cell of claim 1 wherein said second electrode comprises the same alkali metal as is in said first electrode.

3. The electrochemical cell of claim 1 wherein said second electrode comprises a material reactive with and substantially displaced from the alkali metal present as the first electrode.

4. The electrochemical cell of claim 1 wherein said first electrode is sodium.

5. The electrochemical cell of claim 1 wherein said second electrode is sulfur.

6. The electrochemical cell of claim 4 wherein the second electrode is sodium.

7. The electrochemical cell of claim 1 wherein said selenium is present at said interface as an additive to said alkali metal of said first electrode.

8. The electrochemical cell of claim 7 wherein said selenium is present in an amount of at least 0.01% by weight in said alkali metal.

9. The electrochemical cell of claim 7 wherein said selenium is present in an amount of at least 0.5% by weight in said alkali metal.

10. The electrochemical cell of claim 1 wherein said selenium is present at said interface as a material on or near the surface of said electrolyte.

11. The electrochemical cell of claim 1 wherein said electrolyte is beta"-alumina.

12. A method of lowering the internal resistance of an electrochemical cell having a first electrode of a molten alkali metal; a solid, impervious electrolyte containing a mobile alkali metal ion of the same alkali metal as is present in said first electrode, said electrolyte separating said first electrode from a second electrode; and a second electrode of a molten material receptive to the mobile alkali metal ion in said electrolyte; comprising, introducing sufficient selenium to the first electrode side of said cell to reduce significantly the internal resistance of said cell.

13. The method of claim 12 wherein a very small amount of selenium is introduced into the first electrode chamber prior to the addition of the alkali metal.

14. The method of claim 13 wherein said cell containing selenium is heated at a sufficient temperature for a sufficient period of time to dehydrate said cell.

* * * * *

UNITED STATES PATENT OFFICE
CERTIFICATE OF CORRECTION

Patent No. 4,407,912                 Dated  October 4, 1983

Inventor(s)  Anil V. Virkar and Gerald R. Miller

It is certified that error appears in the above-identified patent and that said Letters Patent are hereby corrected as shown below:

In the drawings, Sheet 1, Fig. 2, reference numerals "40" and "44" should be deleted and numeral 26 inserted as outlined below;

Col. 7, line 34, change "24" to ---26---;
Col. 7, line 58, change "26 and 30" to ---16 and 17---.

Signed and Sealed this

Twenty-third Day of October 1984

[SEAL]

Attest:

GERALD J. MOSSINGHOFF

Attesting Officer    Commissioner of Patents and Trademarks